United States Patent [19]

Quasius

[11] 3,862,310

[45] Jan. 21, 1975

[54] COSMETIC COMPOSITIONS CONTAINING FORMYLATED POLYETHYLENE POLYAMINE

[75] Inventor: Alan R. Quasius, Arlington Heights, Ill.

[73] Assignee: The Gillette Company, Boston, Mass.

[22] Filed: Dec. 22, 1971

[21] Appl. No.: 211,115

[52] U.S. Cl.......... 424/70, 252/DIG. 1, 252/DIG. 2, 252/DIG. 3, 252/DIG. 7, 252/DIG. 13, 252/DIG. 14, 252/90, 252/117, 252/525, 252/529, 252/531, 260/29.2 N, 260/88.3 R, 424/DIG. 1, 424/DIG. 2, 424/47, 424/65, 424/71, 424/78, 424/73, 424/362, 424/365
[51] Int. Cl............................................. A61k 7/06
[58] Field of Search ............ 424/DIG. 2, 70, 71, 78; 260/290.2 N, 31.2 N, 88.3 R; 252/DIG. 2, DIG. 3

[56] References Cited

UNITED STATES PATENTS

| 3,200,106 | 8/1965 | Dickson et al..................... 260/97.5 |
| 3,400,198 | 9/1968 | Lang..................................... 424/71 |
| 3,580,853 | 5/1971 | Parran .............................. 424/70 X |
| 3,740,422 | 6/1973 | Hewitt .............................. 424/70 X |

*Primary Examiner*—Stanley J. Friedman
*Assistant Examiner*—Vera C. Clarke

[57] ABSTRACT

Polyethylene mixed polyamines-polyformamides having a molecular weight from 1800 to 200,000 in which from 15 to 60 percent of the total nitrogen atoms are present in the formamide groups are contained in cosmetic compositions to be applied to the skin of hair.

2 Claims, No Drawings

3,862,310

COSMETIC COMPOSITIONS CONTAINING FORMYLATED POLYETHYLENE POLYAMINE

This invention relates to polyethylene mixed polyamines-polyformamides having a molecular weight from 1800 to 200,000 in which from 15 to 60 percent of the total nitrogen atoms are present in the formamide groups, to the method of making such products, and to cosmetic compositions containing such materials.

Branched polyalkylene polyamines have previously been reacted at elevated temperature with fatty acids having 2 or more carbon atoms or with their esters, anhydrides, etc. to provide branched polyalkylene mixed polyamines-polyamides as described in Dickson et al. U.S. Pat. No. 3,200,106.

The products of the present invention display unexpectedly superior properties in cosmetic compositions, particularly shampoos, rinses, and other cosmetic compositions used for cleaning skin or hair and intended to be rinsed away with water, as contrasted to the mixed polyamine-polyamides of the prior art in that they exhibit improved foaming and slower precipitation in use, as well as less scumming of the shampoo and less deposition and build-up of solids on the hair and skin in use. The desirable properties are particularly evident in products in which the extent of formylation and the molecular weight are near the upper end of the ranges set forth above.

The products of the present invention have a weight average molecular weight from about 1,800 to about 200,000 and are made by reacting a polyethylene polyamine such as polyethylenimine with ethyl formate as the formylating agent. While the equivalent percent substitution of the product may vary from 15 to 60 and the molecular weight from about 1,800 to 200,000 as pointed out above, the preferred products are those having an equivalent percent substitution from 45 to 60 and a molecular weight of about 100,000 to 200,000.

For the purpose of the present invention, the number of gram equivalent weights of polyethylene polyamine is the number of gram molecular weights (moles) of such polyamine multiplied by the number of amino groups present in each molecule. The equivalent percent substitution of the product is defined as one hundred times the number of gram molecular weights (moles) of ethyl formate used to make the product divided by the number of gram equivalent weights (equivalent weights) of polyamine used. The equivalent percent substitution is equal to the percent of the total nitrogen atoms in the product which are present in the formamide groups as distinguished from those in amino groups, i.e., the number of formamide groups divided by the total number of nitrogen atoms multiplied by 100.

The formylation reaction is exothermic and proceeds rapidly; it can be most conveniently carried out at ambient or room temperature using water as a solvent for both the polyamine and the formylating agent, although no solvent need be used and mixtures of water with up to 90 percent (by weight of the total solvent mixture) of a lower alkanol such as ethyl or propyl alcohol, may also be used. It is unnecessary to remove the ethanol produced as a by-product of the formylation reaction in order to achieve the desired formylation. Infrared spectroscopic data show the formation of formamide groups even without removal of water or ethanol. The amount of solvent used is not critical; it is usually desirable to employ the solvent (preferably water) in an amount from 1 to 5 times the weight of the polyamine and formylating agent. The two reagents can be introduced simultaneously into the solvent, or either one may be dissolved first after which the other is mixed into the solution. The rate of addition or mixing is also not critical and ordinarily the reagents are mixed as rapidly as possible. The proportions of reagents used are those theoretically required to produce the desired product. The ingredients may simply be mixed and allowed to stand at room temperature; since the reaction is exothermic, the temperature of the mixture will rise. If desired, the mixture may be heated to reflux temperature (about 55°C.) in order to accelerate the reaction.

The solution of polyethylene mixed polyamine-polyamide product as such may be employed as an ingredient in cosmetics such as a shampoo composition, although the product can be isolated in the form of a viscous liquid simply by evaporating the solvent if desired. The product can also be precipitated from solution in the form of a catan complex by introducing an anionic surface-active agent such as sodium lauryl sulfate.

The products of the present invention impart to cosmetic compositions in which they are incorporated the characteristics of leaving in soft and pliable condition the hair or skin to which they are applied, the hair in particular being more easily combed, both wet and dry, than when treated with a similar cosmetic composition containing none of the product.

The cosmetic compositions in which the products may be employed include shampoos, detergent or soap bars, bubble bath and bath oil, deodorants and antiperspirants, hairdressings, shaving preparation compositions and after-shave lotions, hair sprays, and the like. In general, such cosmetic compositions comprise a dermatologically-acceptable cosmetic carrier together with an effective amount of the polyethylene mixed polyamine-polyamide product, which in some cases may be as little as 0.1 percent by weight of the total composition. Up to 10 percent by weight of the products can be used in the case of shampoos and other cosmetic compositions, but usually from 1 to 5 percent, preferably from 2 to 3 percent by weight of the total is desirable. The carrier in the case of most cosmetic compositions, particularly shampoos, comprises a surface-active agent which may be anionic, cationic or nonionic; in other cases, such as after-shaving lotions and hair sprays, the carrier may be simply water, or a mixture of water and a lower alkanol, together with perfume or synthetic resin etc. The cosmetic compositions may, if desired, be packaged in pressure containers together with conventional liquefied gaseous propellants including, for example, hydrocarbons such as n-butane or isobutane present alone or in mixtures thereof with propane; and halogenated hydrocarbons such as those sold under the trademark Freon, for example, dichlorodifluoromethane, monochlorotrifluoromethane, trichlorotrifluoroethane, dichlorotetrafluoroethane, etc. Compressed gas propellants such as nitrogen or the like may also be used either alone or in conjunction with any of the foregoing liquefied gaseous propellants. Any additives conventionally used in such cosmetic compositions can be present in the cosmetic compositions of the present invention, including, without limitation, foaming agents, dye intermediates and modifiers, germicides and bactericides, emollients, softeners, thickening agents, and setting agents. It should also be noted that the polyethylene mixed polyamines-polyamides of the present invention are stable in aqueous solution at a pH from 3.5 to 11, which includes the entire range of most of the conventional cosmetic compositions.

The following specific examples are intended to illustrate more fully the nature of the invention without serving as a limitation upon its scope.

EXAMPLE 1

There were mixed together in a flask equipped with a reflux condenser 43 parts by weight of polyethylenimine (molecular weight about 1,800) and 21.6 parts of ethyl formate. The mixture was heated gently at reflux temperature for 20–30 minutes, at which time the reflux temperature began to rise above 55°C. The product, a pale yellow viscous liquid in which 30 percent of the total nitrogen atoms were present as formamide groups, when subjected to infrared spectroscopic analysis showed that all of the ethyl formate had reacted.

EXAMPLE 2

The procedure described in Example 1 was repeated except that 33.3 parts of ethyl formate were used instead of 21.6 parts. The product was a pale yellow viscous oil in which 45 percent of the total nitrogen atoms were present as formamide groups.

EXAMPLE 3

There were mixed together 129 parts by weight of water, 129 parts of a water solution containing 42.1 parts by weight of polyethylenimine (molecular weight about 60,000), and 33.3 parts of ethyl formate. The mixture was stirred for 2 ½ hours at room temperature, during which time the temperature increased slightly. The product was a pale yellow liquid which, when subjected to infrared spectroscopic examination showed no residual ester groups but instead the presence of amide groups. It contained approximately 45 percent of the total nitrogen atoms in the form of amide groups.

EXAMPLE 4

There were mixed together 103.7 parts by weight of water, 103.7 parts of a water solution containing 34.6 parts of polyethylenimine (molecular weight about 100,000), and 26.8 parts of ethyl formate. Stirring was continued for 24 hours without supplying any heat. The product, a light yellow liquid, contained no residual ester but did contain amide groups, approximately 45 percent of the total nitrogen atoms being present in the amide groups.

EXAMPLE 5

The same procedure was followed as in Example 4 except that there were used 98.2 parts of water, 98.2 parts of a water solution containing 32.7 parts of polyethylenimine having a molecular weight of about 60,000, and 25.4 parts of ethyl formate to produce a product in which 45 percent of the total nitrogen atoms are present as formamide groups.

EXAMPLE 6

There were stirred together without supplying any heat 445 parts by weight of water, 445 parts of a water solution containing 148.3 parts of polyethylenimine having a molecular weight of about 60,000, and 138.4 parts of ethyl formate. A small amount of heat was evolved, and the light yellow viscous liquid product contained no ester linkages but did display amide groupings. Of the total nitrogen atoms in the product 55 percent as formamide groups.

EXAMPLE 7

A shampoo composition was prepared by mixing together the following ingredients.

| | Parts by Weight |
|---|---|
| Sodium lauryl sulfate | 10 |
| Lauric diethanolamide | 5 |
| Hexylene glycol | 3 |
| Methyl p-hydroxybenzoate | 0.1 |
| Boric acid | 1 |
| Sodium chloride | 2 |
| Product of Example 3 (excluding alcohol and water) | 2.5 |
| Ethyl alcohol | 15 |
| Water | to 100 |

Similar shampoos were prepared in which the sodium lauryl sulfate was replaced by an equal amount of sodium lauroyl sarcosinate or N-coco beta amino propionic acid, respectively.

All three shampoos when employed on hair in the usual manner and rinsed off left the hair in excellent condition having improved combing characteristics both wet and dry.

EXAMPLE 8

A shave cream was prepared by mixing together the following ingredients:

| | Parts by Weight |
|---|---|
| Mixed coco fatty acids | 2 |
| Stearic acid | 6 |
| Cetyl alcohol | 0.5 |
| Glycerine | 3 |
| Triethanlamine | 3 |
| Polyoxyethylene sorbitan monolaurate | 2.5 |
| Polyoxyethylene sorbitan monooleate | 2.5 |
| Methyl p-hydroxybenzoate | 0.1 |
| Product of Example 3 (excluding alcohol and water) | 1 |
| Water | 76 |

The cream was packaged in a conventional pressure container along with 3.4 parts by weight of a 90/10 mixture of isobutane and propane as propellant.

The cream was found to function well, leaving the skin in soft, pliable and comfortable condition.

EXAMPLE 9

A hand lotion was prepared by mixing together the following ingredients:

| | Parts by Weight |
|---|---|
| Hexadecyl alcohol | 4.5 |
| Glycerol monostearate | 2.5 |
| Stearic acid | 1.5 |
| Propyl p-hydroxybenzoate | 0.1 |
| Glycerin | 5 |
| Methyl p-hydroxybenzoate | 0.1 |
| Product of Example 3 (excluding alcohol and water) | 1 |
| Methylcellulose (4000 cps) | 0.4 |
| Water | to 100 |

The lotion when applied to the skin left it in a soft and pliable condition.

EXAMPLE 10

A series of shampoo compositions was prepared containing varying quantities of the product of Example 2 and having the general recipe:

|  | Parts by Weight |
|---|---|
| Sodium cocomethyl tauride | 10 |
| Lauryl alcohol | 1 |
| Lauric diethanolamide | 7 |
| Boric acid | 1 |
| Methyl p-hydroxybenzoate | 0.1 |
| Sodium sulfite | 0.2 |
| Hexylene glycol | 3.5 |
| Sodium chloride | 2 |
| Perfume | 0.5 |
| Product of Example 2 (excluding alcohol and water) | Variable |
| Water | to 100 |

Adjusted to pH 7.4 with hydrochloric acid

The amounts of the product of Example 2 used in the series were 0.5, 1.0, 2.0, 3.0, 4.0, and 6.0 respectively. In each case the shampoo was a clear solution and when applied to hair in the usual manner and rinsed with water left the wet hair with improved combing characteristics.

What is claimed is:

1. A cosmetic composition selected from the group consisting of a shampoo, a shave cream and a hand lotion consisting essentially of a dermatologically acceptable carrier and from 0.1 to 10 percent by weight of a water-soluble polymer consisting of polyethylene mixed polyamine-polyformamide in which from 15 to 60 percent of the total nitrogen atoms are present in the formamide groups and the remainder are present in polyethylene imine groups, the molecular weight of said polymer being from about 1,800 to about 200,000.

2. A cosmetic composition as claimed in claim 1 wherein the composition is a shampoo.

* * * * *

UNITED STATES PATENT OFFICE
CERTIFICATE OF CORRECTION

Patent No. 3,862,310          Dated January 21, 1975

Inventor(s) Alan R. Quasius

It is certified that error appears in the above-identified patent and that said Letters Patent are hereby corrected as shown below:

In the Abstract, last line, change "of" to --or--;

Column 1, line 25, change "The" to --These--;

Column 1, line 65, "Infrared" is misspelled;

Column 4, line 5, after "percent", add --were present--;

Column 4, line 41, "Triethanolamine" is misspelled;

Signed and Sealed this thirtieth Day of December 1975

[SEAL]

Attest:

RUTH C. MASON
*Attesting Officer*

C. MARSHALL DANN
*Commissioner of Patents and Trademarks*